Figure 1:
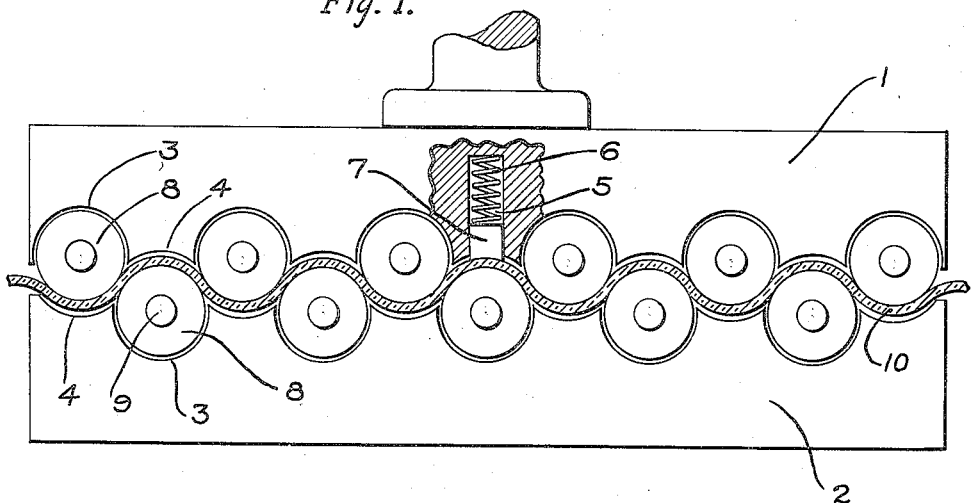

Feb. 12, 1924.

J. J. KEYES

MOLDING

Filed March 14, 1921

1,483,452

WITNESSES:
T. H. Crock.
H. C. Bierman

INVENTOR
John J. Keyes.
BY
Wesley G. Carr
ATTORNEY

Patented Feb. 12, 1924.

1,483,452

UNITED STATES PATENT OFFICE.

JOHN J. KEYES, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDING.

Application filed March 14, 1921. Serial No. 452,109.

*To all whom it may concern:*

Be it known that I, JOHN J. KEYES, a citizen of the United States, and a resident of Wilkinsburg, in the county of Allegheny and State of Pennsylvania, have invented a new and useful Improvement in Molding, of which the following is a specification.

My invention relates to corrugated sheet material, more especially to methods of forming the same.

Heretofore, it has been proposed to form corrugated sheet material by passing strips of vulcanized fibre, wood veneer, paper, and the like, between an endless chain of dies and matrices. In this process, one end of the strip is free, permitting the taking up of the extra material necessary for filling the grooves in the dies and matrices when brought into intimate engagement with the same.

This process is necessarily a continuous one, as the engagement of the die and matrix functions on the principle of engaging gear wheels, the die and matrix representing the tooth and tooth space, respectively, passing through engaging arcs tangent to one another at the points of contact.

In my copending application, filed August 8, 1919, Serial No. 316,104, Case No. 7154, is disclosed an attachment for presses which will permit of producing corrugated surfaces in fibrous sheet material by forming the corrugations individually in successive steps.

My present invention is an improvement over this method in that it permits of curing the entire surface of the sheet material simultaneously, providing uniform treatment for the entire surface and producing an article of uniform quality.

The continuous method cannot be employed where the sheet material utilizes a binder and requires heating for a relatively long period. Another disadvantage is the intermittent curing of a portion of the entire sheet surface, thus forming weak sections between adjacent treatments.

My invention has for its object to provide a means for bringing a plurality of forming dies and matrices into engagement simultaneously without rupturing or otherwise damaging the material placed therebetween. This process is especially adapted for molding corrugated sheet materials requiring the simultaneous application of heat and pressure for a relatively long forming period, usually from one-half hour to one hour, depending on the thickness of the material and the binding agent employed.

In practising my invention, I provide a pair of heatable pressure platens each of which has a plurality of alternate shallow and deep grooves formed in the engaging surfaces thereof, the deep grooves having rotatable cylindrical dies mounted therein, the dies of one platen engaging the shallow grooves or matrices of the opposite platen. I provide a central recess in one of said platens in which I insert a pressure spring which acts upon a movable plunger, the outer surface of which conforms to the contour of the shallow groove or matrix in which it is located.

To form a corrugated sheet, I provide a layer or a plurality of layers of fibrous sheet material impregnated or coated with a fusible binder which I insert between the rotatable dies and stationary matrices of the pressure platens. I then apply pressure, which causes the plunger to engage the matrial in the center to hold it in place while the dies force it into the shallow grooves. By continuing the pressure, with the simultaneous heating of the platens, a hard and coherent corrugated sheet material is formed. When the platens are separated, the spring pressure on the plunger in the central groove of one of the platens holds the central portion of the formed sheet against the central die of the other platen, thus facilitating removal of the sheet.

Figure 2:
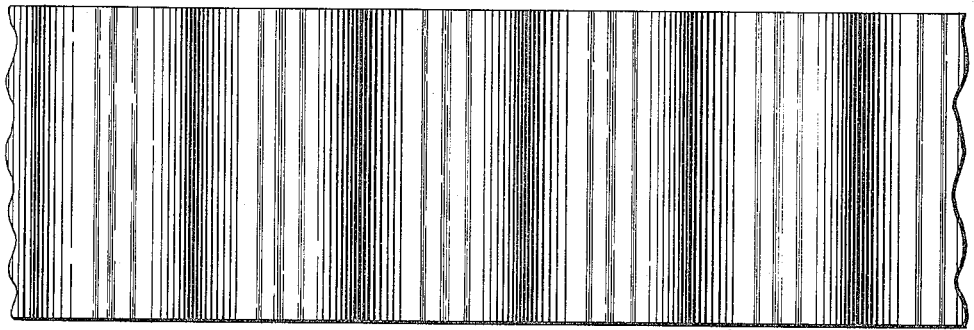
Figure 3:
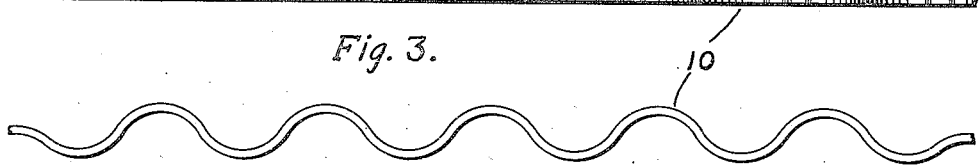

In the accompanying drawings, in which like reference characters designate like parts, Figure 1 is a side elevational view of a mold formed in accordance with this invention, Fig. 2 is a plan view of an article formed therein, and Fig. 3 is a side elevational view thereof, showing the grooves or corrugations.

I provide a pair of heatable pressure platens 1 and 2 having a plurality of alternate deep and shallow grooves 3 and 4, respectively, formed along the adjacent surfaces thereof so that deep grooves 3 are opposite shallow grooves 4.

In a recess 5 in the center of the upper platen 1 is inserted a spring 6 bearing against a movable plunger 7 the outer surface of which conforms to the contour of the corresponding groove 4.

I further provide a plurality of rotatable cylindrical dies 8 which are so mounted in the deep grooves 3 as to be freely rotatable therein.

A plurality of layers of sheet material 10, such as textile fabric, paper or the like, impregnated or coated with a suitable binder, such as a phenolic condensation product, are inserted between the adjacent surfaces of the platens 1 and 2 and the platens are then moved toward each other to force the material into the shallow grooves 4 by means of the dies 8.

As the platens approach each other, the plunger 7 engages the surface of the sheet material to prevent shifting while it is being forced into the grooves 4. The tension, which the platens would otherwise exert upon the material, is relieved by rotative movement of the dies 8 which allows the material to feed towards the center, thus filling the grooves 4 without tearing or straining such material.

Heat and pressure are applied for a suitable period of time until the material becomes a hard, compact and uniformly grooved or corrugated sheet 10. When the pressure is released by separating the platens, the plunger 7 holds the middle of the sheet in contact with the middle die which it opposes until relieved from the pressure of the spring 8.

It is obvious from the above description of my invention that it provides a means for forming large, wide sheets of corrugated material of uniform quality, especially where it is necessary to cure said material in a mold for a relatively long period of time, and it is obvious that the continuous process of the prior art would not be suitable where this is required because of the pressures employed effecting the excessive mechanical stress of the apparatus. Another disadvantage of the continuous process is the intermittent steps in the curing of the material, resulting in lines of weakness in the product.

Although I have described a specific embodiment of my invention it will be obvious to those skilled in the art that various changes may be made in my apparatus without departing from the principles herein set forth.

I claim as my invention:—

1. A mold comprising a pair of co-operating platens having a plurality of alternate deep and shallow grooves formed therein and a plurality of rotatable dies mounted in said deep grooves to co-operate with said shallow grooves.

2. A mold comprising a pair of co-operating platens having a plurality of alternate deep and shallow grooves formed therein and a plurality of rotatable dies mounted in said deep grooves to engage the shallow grooves in the co-operating platen.

3. A mold comprising a pair of co-operating platens having a plurality of alternate uniformly spaced deep and shallow grooves in the adjacent surfaces thereof, the deep grooves of each platen opposing the shallow grooves of the other platen, and a plurality of rotatable dies mounted in said deep grooves.

4. A mold comprising a pair of co-operating platens having a plurality of alternate uniformly spaced deep and shallow grooves formed in the adjacent surfaces thereof, the deep grooves of each platen being opposed to the shallow grooves of the other platen, and a plurality of rotatable cylindrical dies mounted in said deep grooves, a movable member and an operating spring therefor mounted in the central shallow groove of one of the platens.

5. A mold comprising a pair of co-operating platens having a plurality of grooves formed therein and a plurality of rotatable dies co-operating with said grooves, and means for preventing shifting of material being molded.

6. A mold comprising a pair of co-operating platens having a plurality of grooves formed therein and a plurality of rotatable dies co-operating with said grooves, and spring-pressed means for preventing shifting of material being molded.

7. A mold comprising a pair of co-operating platens having a plurality of grooves formed therein and a plurality of rotatable dies co-operating with said grooves, and a spring-pressed plunger for preventing shifting of material being molded.

In testimony whereof, I have hereunto subscribed my name this 26th day of February, 1921.

JOHN J. KEYES.